United States Patent
Kittaka

(10) Patent No.: US 10,107,212 B2
(45) Date of Patent: Oct. 23, 2018

(54) OIL DILUTION ESTIMATION AND MITIGATION CONTROL IN A FUEL INJECTED ENGINE

(71) Applicant: TOYOTA JIDOSHA KABUSHIKI KAISHA, Toyota-shi (JP)

(72) Inventor: Tomoyuki Kittaka, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 15/079,914

(22) Filed: Mar. 24, 2016

(65) Prior Publication Data

US 2016/0298555 A1 Oct. 13, 2016

(30) Foreign Application Priority Data

Apr. 7, 2015 (JP) .................. 2015-078681

(51) Int. Cl.
*G01M 15/00* (2006.01)
*F02D 41/00* (2006.01)
(Continued)

(52) U.S. Cl.
CPC .......... *F02D 41/0025* (2013.01); *F01M 5/04* (2013.01); *F02D 19/0655* (2013.01); *F02D 19/084* (2013.01); *F02D 19/088* (2013.01); *F02D 41/405* (2013.01); *F02D 2041/389* (2013.01); *F02D 2200/023* (2013.01); *F02D 2200/0612* (2013.01); *F02D 2250/11* (2013.01);
(Continued)

(58) Field of Classification Search
CPC ............... F02D 41/0025; F02D 41/405; F02D 19/0655; F02D 19/084; F02D 19/088;
F02D 2041/389; F02D 2200/023; F02D 2200/0612; F02D 2250/11; F02D 9/088;
F02D 9/084; F02D 9/0655; F02D 9/0626;
F01M 5/04; F16N 2200/20; Y02T 10/36;
Y02T 10/44
USPC ..... 123/1 A, 73 AD, 431, 575; 701/103–105
See application file for complete search history.

(56) References Cited

U.S. PATENT DOCUMENTS 8,046,153 B2 * 10/2011 Kurtz ..................... F01N 9/002
123/1 A
8,442,744 B2 * 5/2013 Kurtz ................... F02D 41/005
123/299
(Continued)

FOREIGN PATENT DOCUMENTS

JP  5-149169   6/1993
JP  2012-77732  4/2012

*Primary Examiner* — Hai Huynh
*Assistant Examiner* — Gonzalo Laguarda
(74) *Attorney, Agent, or Firm* — Oblon, McClelland, Maier & Neustadt, L.L.P.

(57) ABSTRACT

A control device for an engine includes an electronic control unit configured to estimate a water content mixed in engine oil based on a history of a fuel injection amount during an operation of the engine and restrain freezing of water such that, when the water content thus estimated is a predetermined amount or more, the electronic control unit increases a mixing amount of the fuel into the engine oil as compared with a case where the water content thus estimated is less than the predetermined amount. The control device estimates the water content mixed in the engine oil as a function of an integrated value of water content while an oil temperature of the engine is less than a predetermined temperature.

8 Claims, 6 Drawing Sheets

(51) Int. Cl.
*F01M 5/04* (2006.01)
*F02D 19/06* (2006.01)
*F02D 41/40* (2006.01)
*F02D 19/08* (2006.01)
*F02D 41/38* (2006.01)

(52) U.S. Cl.
CPC ........... *F16N 2200/20* (2013.01); *Y02T 10/36* (2013.01); *Y02T 10/44* (2013.01)

(56) References Cited

U.S. PATENT DOCUMENTS

| | | | |
|---|---|---|---|
| 2008/0264158 A1* | 10/2008 | Forthmann | F01M 1/18 73/114.55 |
| 2012/0042845 A1* | 2/2012 | Kanai | F01M 1/10 123/196 AB |
| 2018/0003092 A1* | 1/2018 | Macfarlane | F01M 1/16 |

* cited by examiner

OIL DILUTION ESTIMATION AND MITIGATION CONTROL IN A FUEL INJECTED ENGINE

INCORPORATION BY REFERENCE

The disclosure of Japanese Patent Application No. 2015-078681 filed on Apr. 7, 2015 including the specification, drawings and abstract is incorporated herein by reference in its entirety.

BACKGROUND

1. Field of the Invention

The present invention relates to a control device for an engine, particularly to a fuel injection control technique in an engine using an alcohol-containing fuel.

2. Description of Related Art

Conventionally, as a fuel for an engine provided in a vehicle, a fuel containing alcohol such as methanol or ethanol may be used as well as gasoline and light oil (see Japanese Patent Application Publication No. 2012-077732 (JP 2012-077732 A), for example). A vehicle provided with such a type of engine is generally called a flexible fuel vehicle (hereinafter referred to as FFV), and by using an alcohol-containing fuel, environmental performance such as improvement of exhaust-gas emission and reduction of consumption of a fossil fuel is improved.

Even in an engine for such an FFV, engine oil (hereinafter just referred to as the oil) accumulated in an oil pan is sucked up by an oil pump and supplied to each lubrication portion of the engine, similarly to a general gasoline engine. An oil strainer disposed in the oil pan is provided with a mesh that isolates a foreign matter at the time when the oil is sucked, and further, an oil passage communicating with a discharge side of the oil pump is provided with an oil filter of a filter paper type.

SUMMARY

In the meantime, in the engine that uses an alcohol-containing fuel like the above conventional example, more steam is included in combustion gas as compared with a general gasoline engine. Therefore, more condensed water is generated in a crankcase or the like at the time when a temperature of the engine is low like a non-warm-up state, which easily increases a mixing amount of water into the oil accumulated in the oil pan.

The water thus mixed in the oil may be frozen in a cold district or the like, for example, and a generated block of ice might cause clogging in the mesh or the like of the oil strainer. This disturbs circulation of the oil in a lubrication system of the engine, which causes poor lubrication and also causes such a concern that a malfunction of a hydraulic device that receives supply of the oil may occur.

Particularly, in a case where start-up and stop of the engine occur frequently like a hybrid vehicle, for example, an operation of the engine is often stopped in the middle of warm-up. As a result, the water mixed in the oil does not evaporate but is accumulated, which may increase a possibility that the block of ice thus generated in the oil pan causes a problem, as described above.

An aspect of the present invention is to prevent an occurrence of malfunctions such as poor lubrication in an engine that uses an alcohol-containing fuel, by restraining freezing of water mixed in engine oil as described above.

The aspect of the present invention is targeted for a control device for an engine that uses a fuel containing alcohol, and the control device includes water content estimation means configured to estimate a water content mixed in engine oil based on a history of a fuel injection amount during an operation of the engine, and freezing restraint means configured such that, when the water content thus estimated is a predetermined amount or more, the freezing restraint means increases a mixing amount of the fuel into the oil as compared with a case where the water content thus estimated is less than the predetermined amount, such that freezing of water is restrained. The aspect of the present invention can be defined as follows. A control device for an engine is configured to use a fuel containing alcohol, and the control device includes: an electronic control unit configured to: i) estimate a water content mixed in engine oil based on a history of a fuel injection amount during an operation of the engine; and ii) restrain freezing of water such that, when the water content thus estimated is a predetermined amount or more, the electronic control unit increases a mixing amount of the fuel into the engine oil as compared with a case where the water content thus estimated is less than the predetermined amount.

That is, as described above, steam included in combustion gas may be partially condensed and mixed in the engine oil during an operation of the engine, so the water content estimation means estimates a water content mixed in the oil based on a history of a fuel injection amount until now. If the water content reaches a predetermined amount or more, the mixing amount of the fuel into the oil is increased by the freezing restraint means.

Hereby, the alcohol contained in the fuel is mixed with water mixed in the oil so as to restrain its freezing, so blocks of ice to be generated are made small. Further, an amount of blocks of ice is reduced, thereby preventing clogging of a mesh or the like of an oil strainer. Note that the "predetermined amount" of the water content is a water content that may generate a number of blocks of ice that may cause clogging in the mesh of the oil strainer, for example. More specifically, the predetermined amount varies depending on a displacement of the engine, an accumulation amount of the oil, or fineness of the mesh of the oil strainer. In view of this, the predetermined amount is set by experiment or the like.

When the alcohol thus contained in the fuel is mixed with the water content, it is possible to restrain its freezing. Accordingly, in order to obtain a sufficient effect, it is preferable to mix, into the oil, an appropriate amount of the alcohol corresponding to the predetermined amount of the water content. In view of this, it is preferable that the freezing restraint means increase the mixing amount of the fuel into the oil according to the water content thus estimated and according to an alcohol concentration of the fuel.

In order increase the mixing amount of the fuel into the oil as such, an oil passage that is branched from a fuel supply system to reach a crankcase or an oil pan may be provided so that the fuel is directly added to the oil accumulated in the oil pan. Further, in the engine provided with a cylinder injection injector configured to directly inject the fuel into a cylinder, it is preferable to increase the mixing amount of the fuel into the oil by injecting the fuel by the cylinder injection injector from a combustion stroke of the cylinder to an exhaust stroke thereof.

That is, in a case where the fuel is injected by the cylinder injection injector during an operation of the engine, the fuel is generally injected from an intake stroke of the cylinder to a compression stroke thereof, so as to form a flammable fuel/air mixture in the cylinder at around a compression top dead center. However, fuel spray injected (hereinafter referred to as post injection) after such normal fuel injection is easily mixed into an oil film on a cylinder inner peripheral surface without burning too much, so the fuel can be mixed into the oil efficiently.

It is particularly preferable that the fuel be injected by the cylinder injection injector from a second half of the combustion stroke of the cylinder to a first half of the exhaust stroke thereof. The reason is as follows. If the fuel is injected in a first half of the combustion stroke of the cylinder, the fuel spray partially burns, and if the fuel is injected in a second half of the exhaust stroke, the fuel spray partially flows out of the cylinder together with exhaust gas.

In order that an amount of the fuel to burn or flow out with the exhaust gas is as small as possible, it is preferable that the freezing restraint means cause the cylinder injection injector to perform the post injection in a period set by experiment or the like in advance from the combustion stroke of the cylinder to the exhaust stroke thereof. Further, in order to prevent the number of times of the post injection from being increased too much, it is preferable to inject the fuel over the entire period thus set, and further, an injection pressure of the fuel may be increased at the time of the post injection.

In the meantime, about the estimation of the water content mixed in the oil, more specifically, the water content estimation means may integrate a predetermined ratio of the water content in the combustion gas to be generated per combustion cycle while an oil temperature of the engine is less than a predetermined temperature (e.g., an oil temperature corresponding to completion of warming up of the engine, a condensation point of water at a crankcase internal pressure, or the like). Note that, as the predetermined ratio, a ratio of combustion gas that reaches the crankcase from a combustion chamber in the cylinder, and a ratio of water to be cooled off to become condensed water in the crankcase with respect to water included in the combustion gas may be considered.

Then, when a predetermined time has elapsed after the oil temperature of the engine has reached the predetermined temperature, it is considered that the water content mixed in the engine oil evaporates. Accordingly, an estimated value of the water content thus mixed may be reset to zero by the water content estimation means. In the meantime, in a case where the engine is stopped before the oil temperature reaches the predetermined temperature, it is preferable that the estimated value of the water content so far be stored and taken as an initial value from which integration is started after next engine start.

According to the present aspect, in the engine that uses an alcohol-containing fuel, the water content mixed in the engine oil is estimated, and if the water content thus estimated reaches the predetermined amount or more, the mixing amount of the fuel into the oil is increased. Accordingly, it is possible to restrain freezing of the water by the alcohol contained in the fuel. This makes it possible to effectively restrain clogging of the mesh or the like of the oil strainer due to blocks of ice, and to prevent an occurrence of a malfunction such as poor lubrication of the engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
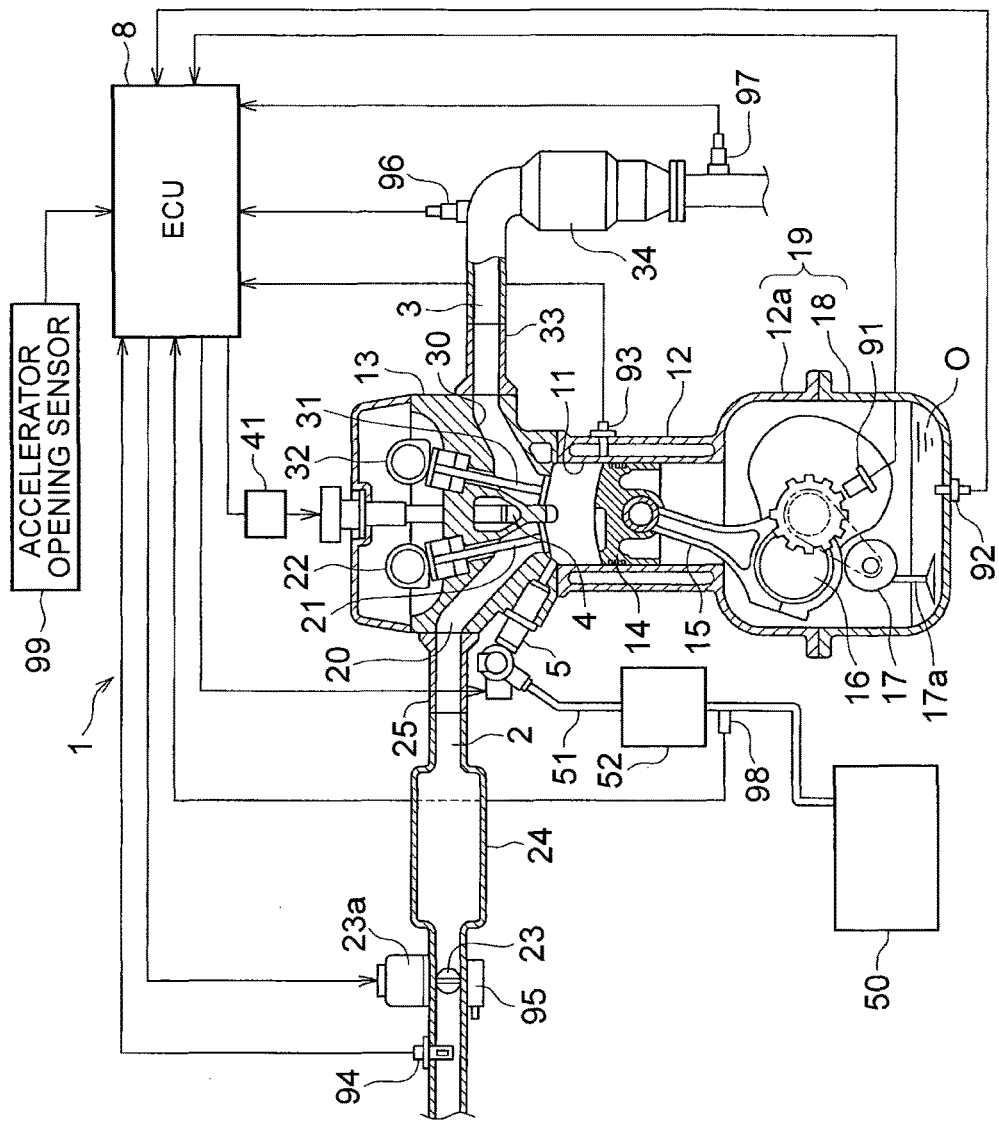
FIG. 1 is a schematic configuration diagram of an engine according to an embodiment of the present invention.

The following describes an embodiment in which the present invention is applied to a cylinder direct injection engine provided in an FFV. FIG. 1 illustrates only one cylinder 11, but the engine 1 of the present embodiment includes a cylinder block 12 provided with four cylinders 11 arranged in line, for example, and a cylinder head 13 attached to an upper part of the cylinder block 12. A piston 14 is inserted into each of the cylinders 11 in a reciprocating manner, and the piston 14 is connected to a crankshaft 16 via a connecting rod 15.

That is, an oil pan 18 that accumulates engine oil O (hereinafter just referred to as the oil O) therein is attached to a lower part 12a of the cylinder block 12, and a crankcase 19 that accommodates the crankshaft 16 therein is constituted by the oil pan 18 and the lower part 12a of the cylinder block 12. A crank position sensor 91 is disposed in the crankcase 19, and an oil temperature sensor 92 is disposed in a bottom of the oil pan 18. Further, a water temperature sensor 93 is also disposed on a side wall portion of the cylinder block 12.

Further, an oil pump 17 driven by the crankshaft 16 via a chain or the like is also disposed in the crankcase 19. The oil O accumulated in the oil pan 18 is sucked up via an oil strainer 17a, and then supplied to each lubrication portion of the engine 1, such as the piston 14 and a bearing of the crankshaft 16. The oil strainer 17a is provided with a mesh (not shown) so as to isolate a foreign matter at the time when a sucked engine oil circulates.

In the meantime, an ignition plug 4 is provided in each cylinder 11 so as to be disposed on a bottom face of the cylinder head 13 that closes an upper end of the cylinder 11, and an intake port 20, which is a downstream end of an intake passage 2, and an exhaust port 30, which is an upstream end of an exhaust passage 3, are opened. An intake valve 21 and an exhaust valve 31 are disposed in the intake port 20 and the exhaust port 30, respectively, so as to be opened and closed by an intake camshaft 22 and an exhaust camshaft 32 of a valve train system.

In the intake passage 2, a throttle valve 23 driven by a throttle motor 23a and a surge tank 24 are disposed on a downstream side relative to an air cleaner (not shown), and an intake manifold 25 is connected to a downstream side thereof. Further, in the intake passage 2, an air flow meter 94 provided with an intake-air temperature sensor, and a throttle opening sensor 95 that detects an opening degree (a throttle opening) of a throttle valve 23 are disposed.

In the meantime, in the exhaust passage 3, an exhaust manifold 33 is disposed so as to gather exhaust ports 30 for respective cylinders 11. A catalyst 34, such as a three-way catalyst, that purifies exhaust gas is disposed on a downstream side relative to the exhaust manifold 33. An A/F sensor (an air-fuel-ratio sensor) 96 is placed on an upstream side relative to the catalyst 34, and an oxygen sensor 97 is disposed on a downstream side relative to the catalyst 34.

Figure 2:
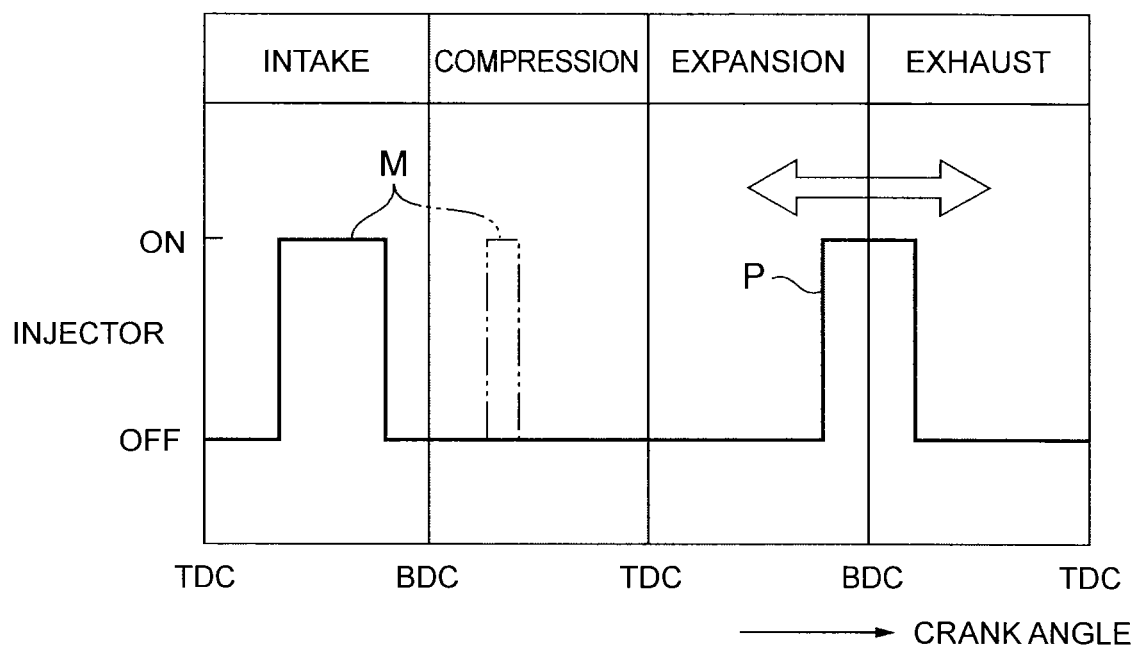
FIG. 2 is an explanatory view schematically illustrating normal fuel injection and post injection.

Further, in the present embodiment, an injector 5 (a cylinder injection injector) is disposed in an intake-side peripheral portion of each cylinder 11. When a fuel is injected by the injector 5 in an intake stroke or a compression stroke (normal fuel injection M) as schematically illustrated in FIG. 2, a fuel/air mixture is formed inside the cylinder 11 by the end of the compression stroke. Upon receiving a high voltage from an igniter 41, the fuel/air mixture is ignited by the ignition plug 4.

A fuel distribution system to the injector 5 of each cylinder 11 includes a fuel tank 50, a fuel supply pipe 51, and a high-pressure fuel pump 52. The high-pressure fuel pump 52 is configured such that a plunger is driven by a driving cam provided in the intake camshaft 22, for example, so as to increase a pressure of a fuel sucked therein and discharge the fuel. In order to detect a temperature of the fuel discharged as such, a fuel temperature sensor 98 is disposed in the fuel supply pipe 51.

In the engine 1 of the present embodiment, not only gasoline, but also blended fuels such as an alcohol fuel of ethanol or the like and gasoline containing alcohol can be used. A user of the FFV generally uses gasoline, an alcohol fuel, and a blended fuel by adding them appropriately. As a result, an alcohol concentration of the fuel accumulated in the fuel tank 50 changes between 0% and 100%.

—ECU—

The ECU 8 is constituted by a well-known electronic control unit, and includes a CPU (Central Processing Unit), a ROM (Read Only Memory), a RAM (Random Access Memory), a backup RAM, and so on, although not illustrated herein. The CPU executes various computing processes based on control programs and maps stored in the ROM. Further, the RAM temporarily stores therein computing results in the CPU, data input from respective sensors, and the like, and the back-up RAM stores therein data and the like to be stored at the time of stop of the engine 1, for example.

The crank position sensor 91, the oil temperature sensor 92, the water temperature sensor 93, the air flow meter 94, the throttle opening sensor 95, the air-fuel-ratio sensor 96, the oxygen sensor 97, the fuel temperature sensor 98, and the like, which are described above, are connected to the ECU 8. Further, an accelerator opening sensor 99 that detects an operation amount (an accelerator opening degree) of an accelerator pedal (not shown) is also connected to the ECU 8 as illustrated in FIG. 1.

The ECU 8 performs an operation control of the engine 1 by executing various control programs based on signals input from the above various sensors. More specifically, the ECU 8 calculates a target torque of the engine 1 based on an accelerator opening degree, a load factor and a rotation number of the engine 1, a vehicle speed, or the like, and executes a control of an ignition timing by the ignition plug 4, a control of fuel injection by the injector 5, and a control of a throttle opening degree by the throttle motor 23a (that is, a control of an intake air amount), so as to output the target torque.

Note that the target torque of the engine 1 is a torque that can realize a behavior that a driver requests to the vehicle by a cooperative control between the engine and a transmission. The ECU 8 calculates a requested torque to the engine 1 by adding, to a driving force that the driver requests to the vehicle, a torque for a loss such as friction that causes a loss in the engine 1 and a power transmission system. By performing a control based on the "torque" having a close relationship with an operation feeling of the driver, it is possible to improve drivability.

Further, as described below, at the time when a temperature of the engine 1 is low like a non-warm-up state, the ECU 8 executes a control (a freezing restraint control) to restrain freezing of burning condensed water mixed in the oil O accumulated in the oil pan 18.

—Freezing Restraint Control—

Next details of a freezing restraint control characteristic in the present embodiment will be described. In the engine 1 that uses an alcohol-containing fuel like the present embodiment, more steam is included in combustion gas. Therefore, more condensed water is generated in the crankcase 19 in a non-warm-up state or the like, which easily increases water to be mixed in the oil O accumulated in the oil pan 18.

The water thus mixed in the oil O may be frozen in a cold district or the like, for example, and blocks of ice generated hereby might cause clogging in the mesh or the like of the oil strainer 17a. When such clogging is caused in a lubrication system of the engine 1, circulation of the oil O is disturbed, which causes poor lubrication and also causes such a concern that a malfunction of a hydraulic device that receives supply of the oil O may occur.

In contrast, the present embodiment focuses its attention on such a fact that, when alcohol is mixed with water, freezing of the water can be restrained. In view of this, by use of the alcohol contained in the fuel, freezing of the water mixed in the oil O is restrained. That is, the alcohol has a higher hydrophilic property than the oil O. Accordingly, if the alcohol-containing fuel is added to the oil O, the water disperses in a colloid shape and a solidifying point of the water decreases, so that the freezing is restrained.

More specifically, in the present embodiment, a mixing amount of the condensed water into the oil O is estimated, and if the mixing amount increases to be a predetermined amount or more, so-called post injection is performed so that the alcohol-containing fuel is mixed into the oil O. The post injection is to inject the fuel in an expansion stroke or an exhaust stroke as schematically illustrated by a reference sign P in FIG. 2, after normal fuel injection M is performed in an intake stroke or a compression stroke.

If a timing at which the post injection is performed is a first half of the combustion stroke, the spray of the fuel thus injected might partially burn. As an injection timing comes closer to an advance side, a burning amount increases. In the meantime, if the post injection is performed in a second half of the exhaust stroke, the spray of the fuel partially flows out of the cylinder 11 together with exhaust gas. As the injection timing comes closer to a retard side, an outflow thereof increases.

In view of this, the timing of the post injection is set by experiment or the like in advance from a second half of the combustion stroke of the cylinder 11 to a first half of the exhaust stroke (schematically indicated by a white arrow in FIG. 2) so that an amount of the fuel to burn or flow out with the exhaust gas is as small as possible. Hereby, the fuel can be mixed into an oil film on an inner peripheral surface of the cylinder 11 without burning the fuel injected by the post injection as much as possible and without flowing the fuel outside the cylinder 11.

In other words, a period (a period of the white arrow of FIG. 2) during which the post injection is performed is set by experiment or the like in advance from the combustion stroke to the exhaust stroke of the cylinder 11 so that an amount of the fuel to burn or flow out with the exhaust gas is as small as possible. Note that the post injection may be performed over the entire period described above, or may be performed in a part of the period.

Figure 3:
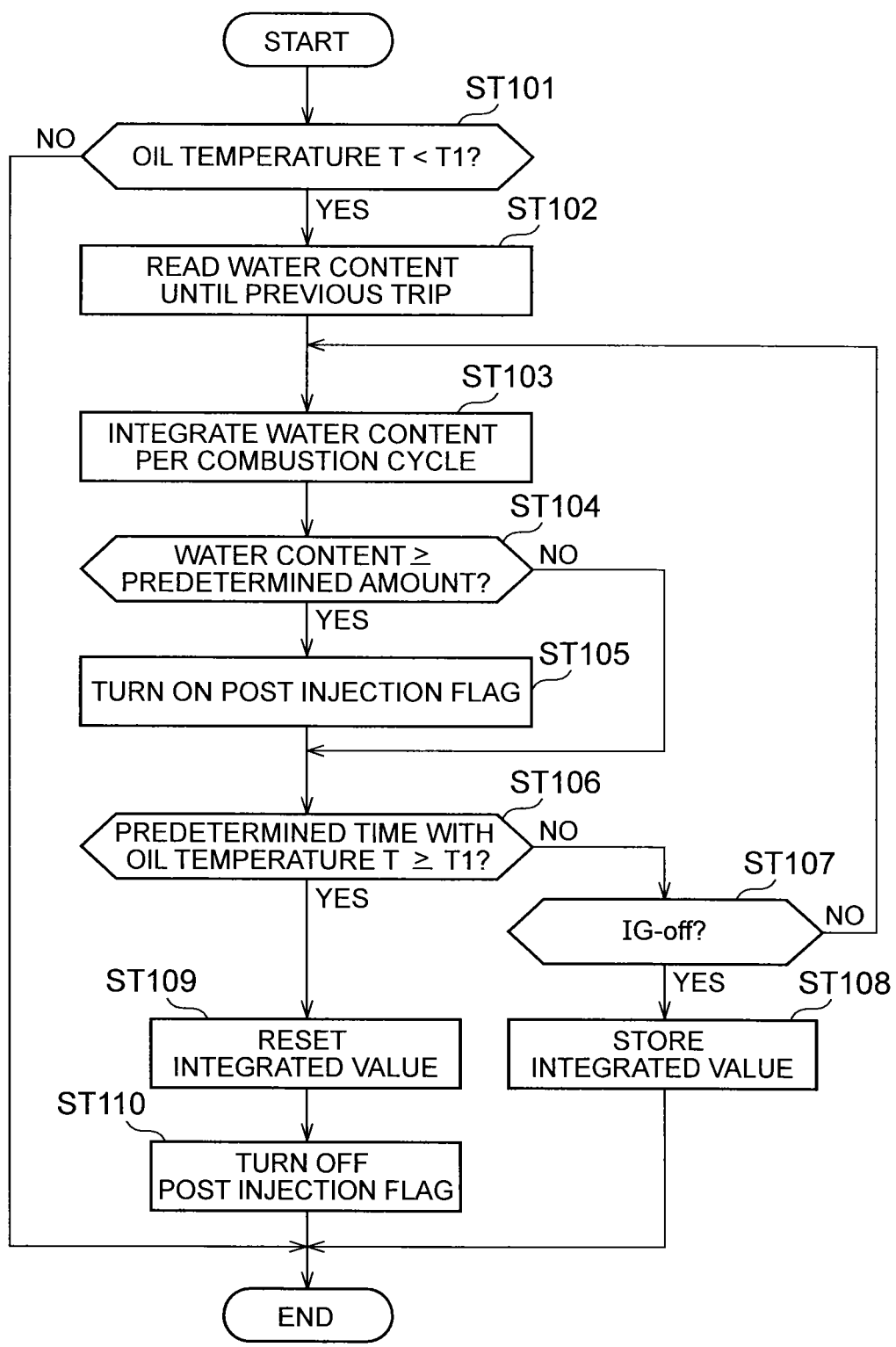
FIG. 3 is a flowchart diagram illustrating a procedure of estimating a water content mixed in oil.
Figure 4:
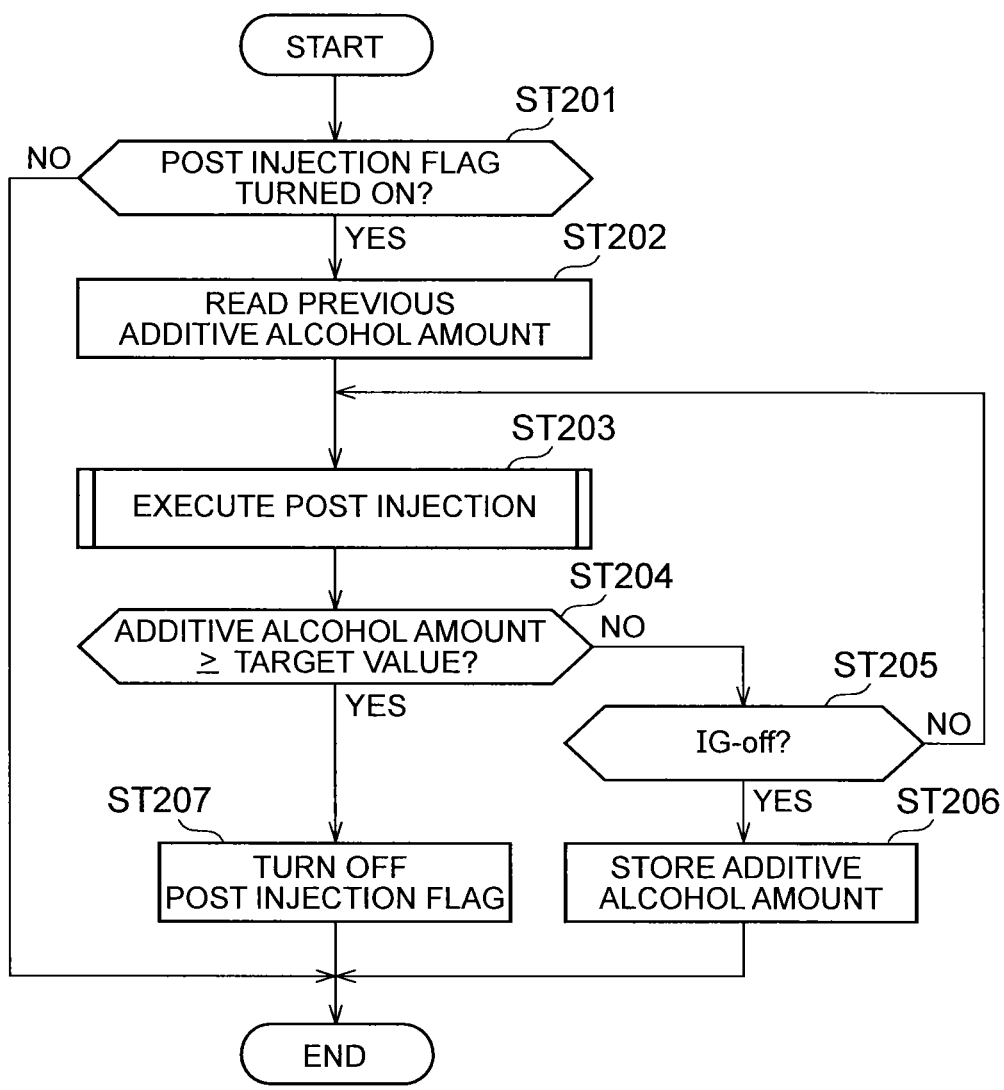
FIG. 4 is a flowchart diagram illustrating a procedure of a freezing restraint control by post injection.

Referring now to FIGS. 3 and 4, the following describes a flow of a specific process of the freezing restraint control in the present embodiment. FIG. 3 is a routine of a process of estimating a water content mixed in the oil O based on a history of a fuel injection amount during the operation of the engine 1, and the routine is executed for a predetermined period after an ignition switch of the FFV is turned on. The ECU 8 constitutes water content estimation means by performing the routine of the estimating process of the water content.

Further, FIG. 4 is a routine of a process of increasing a mixing amount of the fuel into the oil O by executing the post injection at the time when an estimated water content is a predetermined amount or more, and the routine is also executed for a predetermined period after the ignition switch is turned on. By executing the routine of the control process of the post injection, the ECU 8 increases a mixing amount of the fuel into the oil O, and thus constitutes freezing restraint means for restraining freezing of the water.

Initially, in step ST101 after the start of the flow in FIG. 3, a current temperature (hereinafter referred to as the oil temperature T) of the oil O is calculated, and compared with a predetermined temperature T1. The oil temperature T may be detected by a signal from the oil temperature sensor 92, but may be estimated based on a signal from the water temperature sensor 93 and the load factor, the engine speed, and the like of the engine 1, for example. Further, the predetermined temperature T1 is a temperature at which the water mixed in the oil O evaporates, and corresponds to a boiling point of the water.

Here, the boiling point of the water changes depending on pressure, and in a state where the pressure is low, the boiling point decreases. In view of this, as described later with reference to FIG. 5, a map in which the predetermined temperature T1 is set in association with an internal pressure P of the crankcase 19 is formed in advance and electronically stored in the ROM of the ECU 8. The predetermined temperature T1 is set with reference to the aforementioned map from a crankcase internal pressure found based on the load factor and the rotation number during the operation of the engine 1.

In step ST101, if the oil temperature T is the predetermined temperature T1 or more, a negative determination (NO) is made. In this case, it can be considered that no condensed water is generated in the crankcase 19, so the control is finished (END). Meanwhile, if the oil temperature T is less than the predetermined temperature T1, an affirmative determination (YES) is made. At this time, it is considered that condensed water is generated in the crankcase 19 and mixed in the oil O accumulated in the oil pan 18.

In view of this, the process proceeds to step ST102, in which a water content until a previous trip is read, and a water content per combustion cycle is integrated with the water content thus read being taken as an initial value (step ST103). Note that the water content until the previous trip indicates an integrated value stored in the after-mentioned step ST108, and is a water content mixed in the oil O before previous running of the FFV, which is before the ignition switch of FFV is turned on this time.

More specifically, the water content to be mixed in the oil O per combustion cycle is calculated as follows. First, a ratio of combustion gas that reaches the crankcase 19 with respect to combustion gas generated in the cylinder 11 is set for every engine 1 by experiment or the like in advance, and electronically stored in the ROM of the ECU 8. An amount of steam included in the combustion gas is calculated based on an injection amount of the fuel by the injector 5 according to the following chemical formula (1), for example:

$$C_nH_m + O_2 \to nCO_2 + m(H_2O)/2 \quad (1)$$

Figure 5:
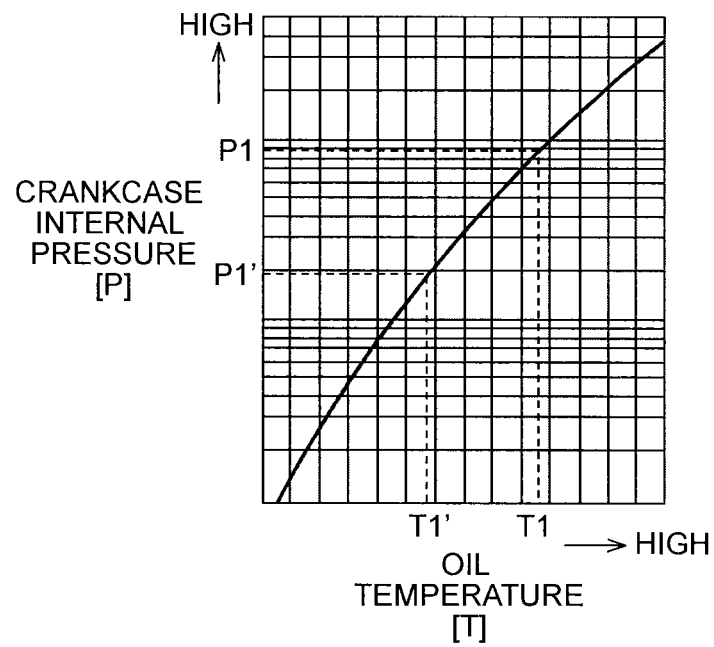
FIG. 5 is a map view that sets a relationship between a crankcase internal pressure and a predetermined temperature of an oil temperature.

Furthermore, in the steam thus included in the combustion gas, steam that is cooled off to become condensed water in the crankcase 19 can be calculated with reference to a map of FIG. 5 as follows. That is, the map of FIG. 5 shows the internal pressure P of the crankcase 19 on a vertical axis, and sets the boiling point of the water under a pressure corresponding to this on a horizontal axis. The map corresponds to a so-called vapor pressure diagram, and is also electronically stored in the ROM of the ECU 8.

For example, if the internal pressure of the crankcase 19 satisfies $P=P1$, the water mixed in the oil O is boiled at the predetermined temperature T1. However, if the oil temperature T at this time satisfies $T=T1'$, a vapor pressure $P1'$ is lower than the crankcase internal pressure P1, so an amount n (mol) of the steam to be condensed is represented by the following formula (2) from a gas equation. Note that V indicates a volume of the crankcase 19, and R indicates a gas constant.

$$n = (P1 - P1') \times V/R \times T1' \quad (2)$$

Figure 6:
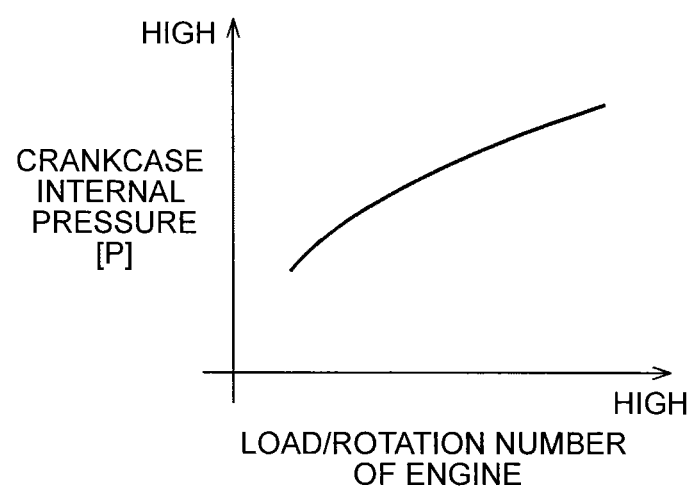
FIG. 6 is a map view that sets a crankcase internal pressure according to an operation state of an engine.

Here, the internal pressure P of the crankcase 19 changes according to the load factor and the rotation number of the engine 1. In view of this, a map as illustrated in FIG. 6 is formed by quantitatively finding a relationship of the load factor and the engine rotation number with the crankcase internal pressure P by experiment or the like in advance, and electronically stored in the ROM of the ECU 8. In this map, as the load factor and the engine rotation number are higher, the crankcase internal pressure P also becomes higher.

As described above, the integrated value of the water content to be calculated in step ST103 may be eventually a small one of the followings: a water content calculated based on a fuel injection amount per combustion cycle according to the above formula (1); and an amount of condensed water (an amount calculated according to the above formula (2)) generated such that the combustion gas is cooled down in the crankcase 19.

Then, it is determined in step ST104 whether the water content (the integrated value) thus integrated reaches a predetermined amount or more. The predetermined amount is, for example, a water content that may generate a number of blocks of ice that may cause clogging in the mesh of the oil strainer 17a. The predetermined amount varies depending on a displacement of the engine 1, an accumulation amount of the oil, or fineness of the mesh of the oil strainer 17a.

In view of this, while an operation state of the engine 1 such as the load factor and the rotation number is considered, how much clogging in the mesh due to the blocks of ice causes how much shortage of oil supply and how much damage on the lubrication portions is examined by experiment or the like in advance. Then, a clogging degree that does not cause a substantial damage on the lubrication portions is specified, and an amount of blocks of ice, i.e., a water content, which causes such clogging is set as the predetermined amount.

In step ST104, the predetermined amount thus set is compared with the water content thus integrated (the integrated value), and if the integrated value of the water content is less than the predetermined amount (negative determination: NO), it is determined that the post injection is unnecessary, and the process proceeds to step ST106 (described later). In the meantime, if the integrated value is the predetermined amount or more (affirmative determination: YES), the process proceeds to step ST105, in which a post injection flag is turned on. After that, the process proceeds to step ST106.

In step ST106, it is determined whether or not a predetermined time has elapsed after the oil temperature T has reached the predetermined temperature T1 or more. As described above, the predetermined temperature T1 is a temperature at which the water mixed in the oil O evaporates. If the oil temperature T reaches this temperature, the water in the oil O evaporates within the predetermined time (generally 10 to 30 seconds, which is set by experiment or the like in advance). In view of this, if the oil temperature T is less than the predetermined temperature T1, or even in a case where the oil temperature T is the predetermined temperature T1 or more, if the predetermined time has not elapsed, a negative determination (NO) is made, and the process proceeds to step ST107.

In step ST107, it is determined whether or not the ignition switch of the FFV is turned off (IG-off?). If a negative determination (NO) is made, the process returns to step ST103, and a procedure from step ST103 to step ST106, that is, the integration of the water content per combustion cycle is repeated. In the meantime, if the ignition switch is turned off and an affirmative determination (YES) is made, the integrated value so far is stored in the backup RAM of the ECU 8, and the control is finished (END).

That is, at the time when the oil temperature T is low like in a non-warm-up state of the engine 1, the integrated value gradually increases as the mixing of the condensed water into the oil O progresses. If the engine 1 is stopped before the engine 1 is warmed up sufficiently, an integrated value at the time point is stored, and the integrated value is taken as an initial value to estimate a water content mixed in the oil O after the engine 1 is started next time.

In the meantime, if an affirmative determination (YES) is made in step ST106 such that the predetermined time has elapsed after the oil temperature T has reached the predetermined temperature T1 or more, the water mixed in the oil O evaporates as described above. In view of this, the integrated value is reset to zero (step ST109), and the post injection flag is turned off (step ST110). Here, the control is finished (END).

Next the control of the post injection illustrated in FIG. 4 will be described. In step ST201 after the start, it is determined whether the post injection flag is turned on or not. If the post injection flag is turned off (negative determination: NO), the post injection is not performed, so the control is finished (END). Meanwhile, if the post injection flag is turned on (affirmative determination: YES), the process proceeds to step ST202, in which an additive alcohol amount until a previous trip is read. Subsequently, in step ST203, the post injection is executed for each cylinder 11 at a predetermined timing.

Here, the additive alcohol amount is an amount of alcohol to be mixed in the oil O by performing the post injection in step ST203 described below. An additive alcohol amount to be stored in step ST206 (described later) until previous running of the FFV, which is before the ignition switch of FFV is turned on this time, is the additive alcohol amount until the previous trip.

Most of the spray of the fuel injected by the post injection is mixed into an oil film on a cylinder inner peripheral surface. When the oil film is scratched off by a piston ring, the fuel is mixed into the oil O in the oil pan 18. In order that the alcohol contained in the fuel thus mixed in the oil O is mixed with the water similarly mixed in the oil O so as to restrain its freezing sufficiently, it is desirable to add, to the oil O, an appropriate amount of the alcohol corresponding to the predetermined amount of the water included in the oil O.

In view of this, initially, a map is formed by finding a suitable additive alcohol amount by experiment/simulation in advance in association with the predetermined amount of the water, and electronically stored in the ROM of the ECU 8. The map is set such that, when an estimated water content is large, for example, the additive alcohol amount is also large as compared with a case where the estimated water content is small. Then, after the suitable additive alcohol amount is read with reference to the map based on the predetermined amount of the water, the additive alcohol amount until the previous trip, which is read in step ST202, is subtracted from the suitable additive alcohol amount, so as to set a target value of an amount of the alcohol to be added during an operation of the engine 1 this time.

The target value of the amount of the alcohol to be added is set as such, and the fuel is mixed into the oil O by the post injection as described below. Hereby, the additive alcohol amount is increased to the target value. As described above, in the FFV, an alcohol concentration of the fuel generally changes in the range from 0 to 100%. Accordingly, as the alcohol concentration is lower, a mixing amount of the fuel into the oil O is larger. That is, the mixing amount into the oil O is increased according to the alcohol concentration of the fuel in the present embodiment.

Note that, when the fuel is mixed into the oil O, not only the alcohol but also gasoline and so on are mixed into the oil O. This may cause an adverse effect due to so-called oil dilution. In view of this, it is preferable to set an upper limit guard value to the target value of the additive alcohol amount to be set as described above. That is, the upper limit guard value may be set by experiment or the like in advance such that an amount of the gasoline and so on to be mixed into the oil O is calculated based on the alcohol concentration of the fuel, so that the adverse effect of oil dilution is not so large.

As described above, in the FFV, the alcohol concentration of the fuel generally changes in the range from 0 to 100%. Accordingly, it is necessary to estimate the alcohol concentration. Various methods are well known about the estimation of the alcohol concentration, so detailed explanations thereof are omitted herein, but the alcohol concentration can be estimated based on a change in an actual air-fuel ratio (detected based on a detection value from the air-fuel-ratio sensor 96) caused due to a change in a fuel injection amount according to the alcohol concentration of the fuel, for example.

As described above with reference to FIG. 2, the injector 5 is operated from the combustion stroke to the exhaust stroke of the cylinder 11, so as to execute the post injection. A post injection amount for one time can be calculated from a width of its injection pulse and a fuel pressure (a prescribed value), and an increased amount of the additive alcohol amount can be obtained by multiplying the post injection amount by the alcohol concentration. It is determined, in step ST204, whether a current additive alcohol amount obtained by integrating the increased amount of the additive alcohol amount by the post injection has reached the target value or not.

If the additive alcohol amount is less than the target value, a negative determination (NO) is made, and the process proceeds to step ST205, in which it is determined whether or not the ignition switch is turned off (IG-off?). If a negative determination (NO) is made, the process returns to step ST203, and the post injection per combustion cycle is continued. In the meantime, if the ignition switch is turned off and a positive determination (YES) is made, the additive alcohol amount so far is stored in the backup RAM of the ECU 8, and the control is finished (END).

That is, if the engine 1 is stopped before the additive alcohol amount reaches the target value, the additive alcohol amount at the time point is stored, and the additive alcohol amount is taken as an initial value to calculate an additive alcohol amount after the engine 1 is started next time. Meanwhile, if an affirmative determination (YES) is made in step ST204 such that the additive alcohol amount has reached the target value, the post injection flag is turned off (step ST207), and the control is finished (END).

The routine (FIG. 3) of the water content estimating process and the process routine (FIG. 4) of the freezing restraint control by the post injection, as described above, are both implemented by execution of a predetermined program by the ECU 8. The following describes the water content estimating process and a process of mixing the alcohol into the oil O by the post injection with reference to a time chart of FIG. 7.

Figure 7:
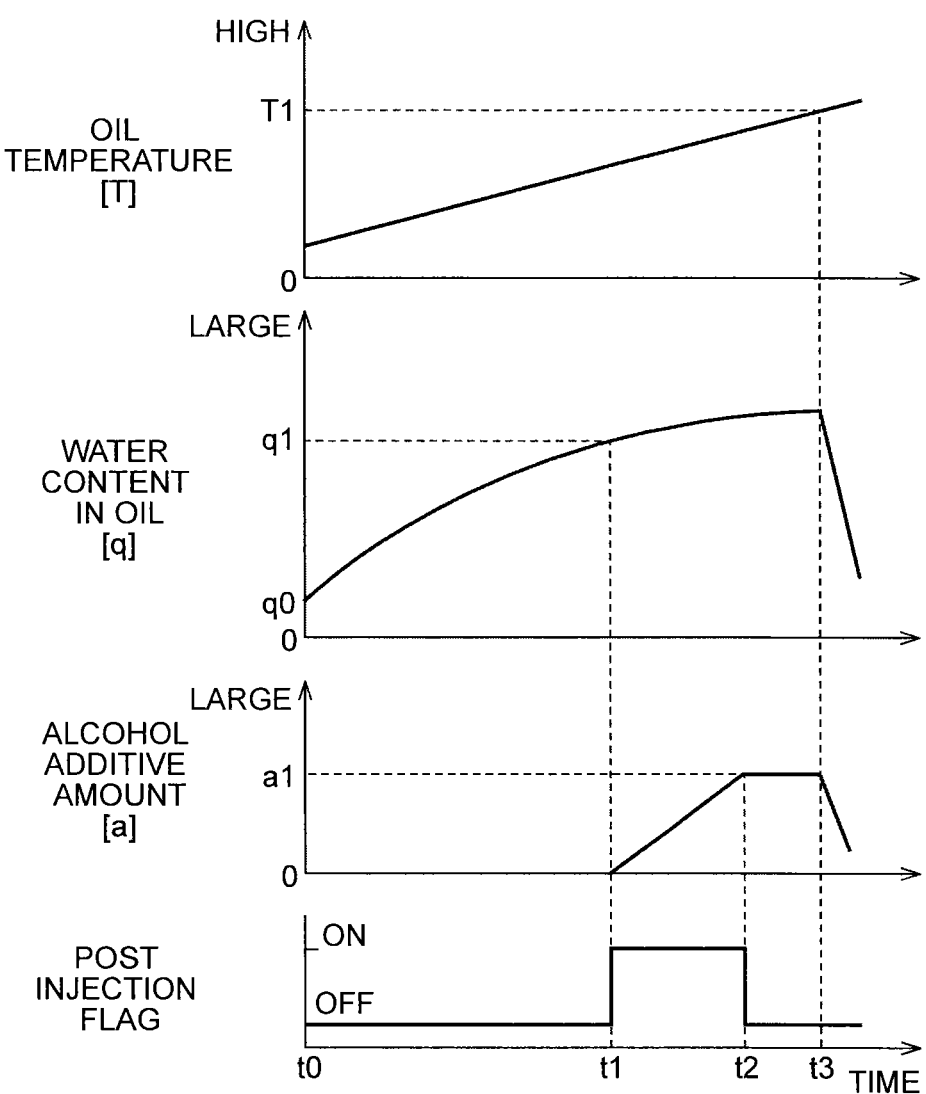
FIG. 7 is a timing chart diagram illustrating the freezing restraint control by the post injection.

Initially, when the engine 1 is started at a time t0 in FIG. 7, the oil temperature T begins to increase immediately. The oil temperature T before the engine start is generally the same as an outdoor temperature, and may be about 0° C. to 5° C. in a cold district or the like. At the time when the temperature of the engine 1 is low as such, a large amount of condensed water is generated in the crankcase 19, so that a mixing amount q of the water into the oil O in the oil pan 18 increases as time passes. Note that, in this example, the water content at the time of the engine start is not zero (0), but is a water content q0 until a previous trip.

When the water content q in the oil O reaches a predetermined amount q1 (time t1), the post injection flag is turned on. Accordingly, as described above with reference to FIG. 2, the injector 5 of each cylinder 11 performs post injection (P of FIG. 2) after normal fuel injection (M of FIG. 2). Since the fuel injected by the post injection is mixed into the oil O efficiently, an additive amount a of the alcohol to the oil O increases as time passes. When the alcohol amount a reaches a predetermined amount a1 corresponding to the water content q1 (time t2), the post injection flag is turned off.

Hereby, the post injection is stopped. However, since a suitable additive amount a1 of the alcohol, corresponding to the water content q1, has been already mixed in the oil O, the water disperses in the oil O in a colloid shape, and a solidifying point of the water is decreased, so that its freezing is restrained sufficiently. Consequently, blocks of ice to be generated become small and an amount thereof is reduced, thereby effectively restraining clogging of the mesh or the like of the oil strainer 17*a* and preventing a malfunction such as poor lubrication of the engine 1.

Note that, subsequently, when the oil temperature T increases and reaches the predetermined temperature T1 or more (time t3), the water content and the alcohol mixed in the oil O evaporate, so that the water content q and the additive alcohol amount a in the oil O decrease immediately.

OTHER EMBODIMENTS

The description of the above embodiment is just an example, and is not intended to limit a configuration, a purpose, and the like of the present invention. For example, in the present embodiment, the water content to be integrated per combustion cycle of the engine 1 is a small one of an amount of steam in the combustion gas and an amount of condensed water to be generated in the crankcase 19, but the present embodiment is not limited to this. For example, the water content to be integrated can be calculated by multiplying, by a predetermined coefficient, an amount of steam in combustion gas generated per combustion cycle.

Further, the mixing amount of the fuel into the oil O is increased according to the integrated value (predetermined amount) of the water content thus calculated, but the present embodiment is also not limited to this. A suitable value may be set by experiment or the like in advance as the mixing amount of the fuel into the oil O.

Further, unlike the above embodiment, the alcohol concentration of the fuel may not be estimated, but an alcohol concentration sensor may be provided in the fuel supply pipe 51 so as to detect the alcohol concentration. As the alcohol concentration sensor, an electrostatic capacity sensor that detects the alcohol concentration based on permittivity of the fuel may be used, or an optical sensor that detects the alcohol concentration based on a refractive index of the fuel may be used.

Furthermore, in the above embodiment, the alcohol is added by performing the post injection to increase the mixing amount of the fuel into the oil O. However, the present embodiment is not limited to this, and an oil passage (not shown) that is branched from the fuel supply pipe 51 so as to reach the crankcase 19 may be provided, so that the fuel is directly added to the oil O accumulated in the oil pan 18.

Further, the above embodiment deals with an example in which the present invention is applied to an in-line multi-cylinder engine 1. However, the present invention is not limited to this, and is also applicable to a single cylinder engine, a V-engine, a horizontally opposed engine, and the like. The present invention is also applicable to an engine provided in a hybrid system including an electric motor.

The present invention can prevent an occurrence of a malfunction such as poor lubrication that can be caused in a cold district or the like, in an engine that uses an alcohol-containing fuel. Accordingly, the present invention yields a high effect when the present invention is applied to an engine of an automobile such as an FFV.

What is claimed is:

1. A control device for an engine configured to use a fuel containing alcohol, the control device comprising:
   electronic control circuitry programmed to
   i) estimate a water content mixed in engine oil based on a history of a fuel injection amount during an operation of the engine, and
   ii) when an estimated water content is equal to or larger than a predetermined amount, increase a mixing amount of the fuel into the engine oil as compared with a case where the estimated water content is smaller than the predetermined amount such that freezing of water is restrained, wherein
   the electronic control circuitry is programmed to estimate the water content mixed in the engine oil as a function of an integrated value of water content while an oil temperature of the engine is less than a predetermined temperature.

2. The control device according to claim 1, wherein
   the electronic control circuitry is programmed to increase the mixing amount of the fuel into the engine oil according to the estimated water content.

3. The control device according to claim 1, wherein the electronic control circuitry is programmed to increase the mixing amount of the fuel into the engine oil according to an alcohol concentration of the fuel.

4. The control device according to claim 1, wherein the engine includes a cylinder injection injector that directly injects the fuel into a cylinder, and the electronic control circuitry is programmed to increase the mixing amount of the fuel into the engine oil by injecting the fuel by the cylinder injection injector from a combustion stroke of the cylinder to an exhaust stroke of the cylinder.

5. The control device according to claim 4, wherein the electronic control circuitry is programmed to inject the fuel from a second half of the combustion stroke of the cylinder to a first half of the exhaust stroke of the cylinder.

6. The control device according to claim 1, wherein the integrated value of water content is determined by integrating a predetermined ratio of water in combustion gas to be generated per combustion cycle while the oil temperature of the engine is less than the predetermined temperature.

7. The control device according to claim 1, wherein the electronic control circuitry is programmed to reset the estimated value of the water content mixed in the engine oil when a predetermined time has elapsed after the oil temperature of the engine has reached the predetermined temperature.

8. A control device for an engine configured to use a fuel containing alcohol, the control device comprising:
water content estimation means for estimating a water content mixed in engine oil based on a history of a fuel injection amount during an operation of the engine; and
freezing restraint means for, when an estimated water content is equal to or larger than a predetermined amount, increasing a mixing amount of the fuel into the engine oil as compared with a case where the estimated water content is smaller than the predetermined amount such that freezing of water is restrained, wherein
the freezing restraint means estimates the water content mixed in the engine oil as a function of an integrated value of water content while an oil temperature of the engine is less than a predetermined temperature.

* * * * *